(12) United States Patent
Ahn et al.

(10) Patent No.: US 8,726,101 B2
(45) Date of Patent: May 13, 2014

(54) APPARATUS AND METHOD FOR TRACING MEMORY ACCESS INFORMATION

(75) Inventors: Hyun-Joo Ahn, Suwon-si (KR);
Jae-Hoon Jeong, Yongin-si (KR);
Sung-Hwan Hyun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 13/192,667

(22) Filed: Jul. 28, 2011

(65) Prior Publication Data
US 2012/0124429 A1    May 17, 2012

(30) Foreign Application Priority Data
Nov. 16, 2010  (KR) .................. 10-2010-0114046

(51) Int. Cl.
*G06F 11/00* (2006.01)

(52) U.S. Cl.
USPC ............. 714/48; 714/6.1; 714/38.1; 714/47.1

(58) Field of Classification Search
USPC .......... 714/6.1, 25, 29, 38.1, 42, 47.1, 48, 53; 711/163
See application file for complete search history.

(56) References Cited

U.S. PATENT DOCUMENTS

| | | | | |
|---|---|---|---|---|
| 6,397,242 | B1 * | 5/2002 | Devine et al. ................. | 711/153 |
| 2007/0005919 | A1 * | 1/2007 | van Riel ......................... | 711/163 |
| 2007/0067590 | A1 * | 3/2007 | Savagaonkar et al. ........ | 711/163 |
| 2008/0235757 | A1 * | 9/2008 | Li ..................................... | 726/1 |
| 2008/0301389 | A1 * | 12/2008 | Kim et al. ...................... | 711/163 |
| 2009/0172330 | A1 * | 7/2009 | Dewan et al. .................. | 711/163 |
| 2013/0091318 | A1 * | 4/2013 | Bhattacharjee et al. ...... | 711/163 |

* cited by examiner

*Primary Examiner* — Joseph D Manoskey
(74) *Attorney, Agent, or Firm* — NSIP Law (57) ABSTRACT

An apparatus and method for tracing memory access information of a user program while ensuring a normal operation of the user program. An access permission about a memory region may be set to trace the memory access information. An instruction of the user program encounters a page fault according to the set access permission. If the page fault occurs, memory access information is stored based on the page fault, and apparatus executes an instruction causing the page fault while in a supervisor mode.

20 Claims, 9 Drawing Sheets

APPARATUS AND METHOD FOR TRACING MEMORY ACCESS INFORMATION

CROSS-REFERENCE TO RELATED APPLICATION(S)

This application claims the benefit under 35 U.S.C. §119(a) of Korean Patent Application No. 10-2010-0114046, filed on Nov. 16, 2010, the entire disclosure of which is incorporated herein by reference for all purposes.

BACKGROUND

1. Field

The following description relates to an apparatus and method for tracing memory access information.

2. Description of the Related Art

Various types of programs are executed on equipment such as computers, mobile phones, and smart phones. In executing a program, the program may be assigned a predetermined portion of memory. For example, a program may need to access a predetermined region of memory to perform execution. In this example, a memory access related error may occur.

An example of the memory access related error is a buffer overflow. A memory region allocated for a program may be specified by a predetermined pointer. If an operation error occurs in the indicator, the indicator may point to another region other than the allocated region, resulting in the buffer overflow.

The memory access related error may cause unexpected operation during the execution of a program. In this regard, many studies have been conducted on a method of tracing memory access information of a program to detect a memory access related error.

For example, to trace memory access information, a predetermined instruction function used to extract memory access information may be inserted into a source code or a binary code of a program. In this scheme, all memory regions accessed by a program are traced and the memory access related error may be easily detected. However, because memory regions other than a memory region of interest are traced, the amount of collected information is unnecessarily increased.

As another example of a method of tracing memory access information, a page fault exception may be used. In this scheme, when a program accesses a memory region and a page fault occurs, only the memory region corresponding to the page fault is traced. Therefore, the memory access of a program is traced with a small amount of access information being collected. However, while the exception is being processed, the program stops operation. As a result, a normal execution of the program cannot be guaranteed.

SUMMARY

In one general aspect, there is provided an apparatus for tracing memory access information, the apparatus including a memory access permission managing unit configured to set an access permission about a memory region to be used by a user program such that an access to the memory region is not allowable at a user mode and is allowable at a supervisor mode, and an exception handling unit configured to store memory access information of the user program at the supervisor mode when a page fault occurs based on the access permission, and to execute an instruction causing the page fault.

The exception handling unit may comprise a determination unit configured to determine whether the page fault is caused by the access permission that is set by the memory access permission managing unit, a storage unit configured to store memory access information that is related to the instruction causing the page fault, if the page fault is caused by the access permission that is set by the memory access permission managing unit, and an execution unit configured to execute the instruction causing the page fault, if the page fault is caused by the access permission that is set by the memory access permission managing unit.

The storage unit may store memory access information that comprises at least one of an address of the instruction causing the page fault, a type of the instruction causing the page fault, an address of a memory region at which the page fault occurs, a time at which the page fault occurs, and an identifier of a process or a thread including the instruction causing the page fault.

The execution unit may comprise an instruction generating unit configured to generate an instruction that is substantially the same as the instruction causing the page fault, based on context information that is generated according to the page fault, a context update unit configured to execute the generated instruction and update the context information, and a return location setting unit configured to set a return location of the updated context information to a location behind a location of the instruction causing the page fault.

The context information may include an execution result of instructions and/or register information that are obtained up until the page fault occurs.

The access permission may be recorded to a predetermined field of an address translation table, and the predetermined field may correspond to the memory region to be used by the user program.

In another aspect, there is provided a method of tracing memory access information, the method including setting an access permission about a memory region to be used by a user program such that an access to the memory region is not allowable at a user mode and is allowable at a supervisor mode, storing memory access information about the user program at the supervisor mode when a page fault occurs based on the access permission that is set in the setting of the access permission, and executing an instruction causing the page fault.

The storing of the memory access information about the user program and executing of the instruction causing the page fault may comprise determining whether the page fault is caused by the access permission, storing memory access information related to the instruction causing the page fault, if the page fault is caused by the access permission, and executing the instruction causing the page fault if the page fault is caused by the access permission.

The executing of the instruction causing the page fault may comprise generating an instruction substantially the same as the instruction causing the page fault based on context information that is generated according to the page fault, executing the generated instruction and updating the context information according to a result of the execution of the instruction, and setting a return location of the updated context information to a location that is behind a location of the instruction causing the page fault.

In another aspect, there is provided an apparatus including a memory access managing unit configured to set access permission of a region of memory, a determination unit configured to determine that a page fault is caused by the access permission set by the memory access managing unit, and an exception handling unit, in response to determining a page fault is generated based on the access permission, configured to store memory access information of a user program and to execute an instruction of the user program.

The determination unit may determine that the page fault is caused by the instruction of the user program accessing the region of memory that has access permission set by the memory access unit.

The exception handling unit may comprises a storage unit to store the context information of the user program, in response to determining the instruction that caused the page fault is to be traced.

The context information may comprise at least one of an address of the instruction causing the page fault, a type of the instruction causing the page fault, an address of a memory region at which the page fault occurs, a time at which the page fault occurs, and an identifier of a process or thread including the instruction causing the page fault.

The instruction that is executed by the exception handling unit may be substantially the same as the instruction that causes the page fault, and the substantially the same instruction may be generated based on the memory access information stored by the exception handling unit.

The apparatus may further comprise a tracing unit that traces the instruction that causes the page fault while the exception handling unit simultaneously executes the instruction.

The memory access permission management unit may set the access permission of the region of memory such that the region of memory is not allowed to be accessed while the apparatus is in user mode and such that the region of memory is allowed to be accessed while the apparatus is in supervisor mode.

The exception handling unit may comprise an instruction generating unit that generates an instruction that is substantially the same as the instruction that causes the page fault, based on context information of the user program that is stored in response to the occurrence of the page fault, and the exception handling unit executes the substantially the same instruction.

The substantially the same instruction may produce the same execution result as the instruction that causes the page fault.

The exception handling unit may comprise a return location setting unit that sets a return location of the user program to an instruction that is directly after the instruction causing the page fault, such that the user program continuously operates without interruption.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
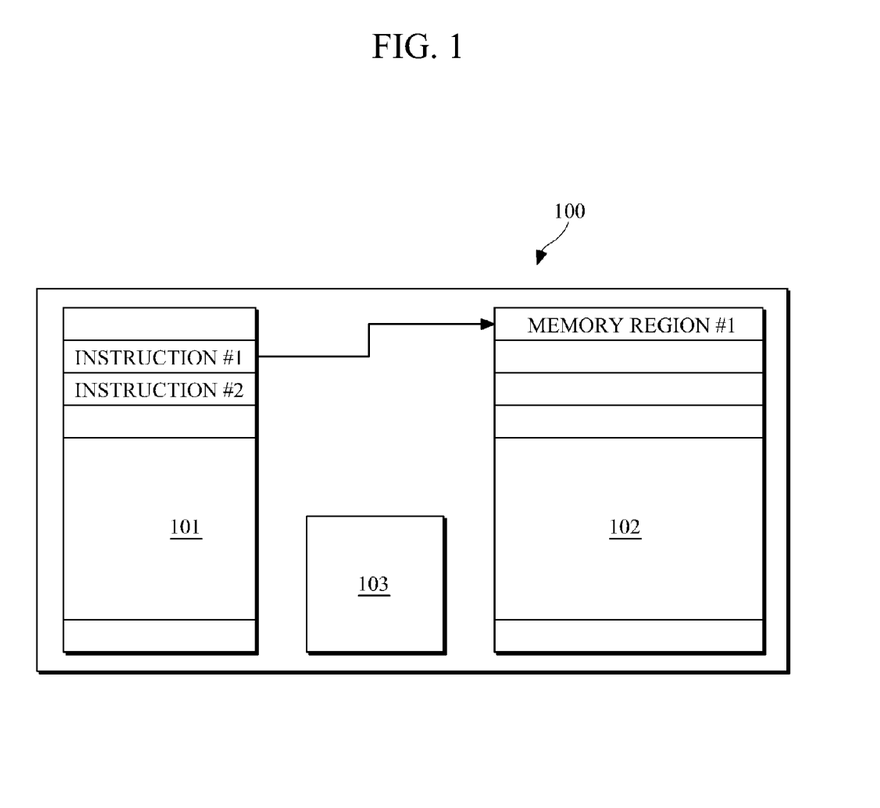
FIG. 1 is a diagram illustrating an example of a computing apparatus.

FIG. 1 illustrates an example of a computing apparatus.

Referring to FIG. 1, computing apparatus 100 may be an electronic equipment, for example, a personal computer, a mobile terminal such as a smart phone, an mp3 player, and the like. In this example, the computing apparatus 100 includes a user program 101, a memory 102, and a tracing unit 103.

The user program 101 may include various types of applications that are executable by the computing apparatus 100. When the user program 101 is executed on the computing apparatus 100, the user program 101 may access a predetermined region of the memory 102. The tracing unit 103 may trace memory access information about the user program 101 accessing the memory 102. For example, the tracing unit 103 may identify or otherwise keep track of regions of memory that are accessed by the user program 101.

For example, the access information may includes information indicating a region of memory that is accessed by an instruction of the user program 101 and which instruction accesses that region of memory. For example, the memory access information may includes an address of a corresponding memory region, a type and address of an instruction that accesses the corresponding memory region, an identifier (ID) of a process or a thread including the instruction, and an access time.

In this example, the tracing unit 103 may trace memory access information of the user program 101 while executing the user program 101 in a supervisor mode or a kernel mode. For example, if a page fault occurs during the execution of instruction #1 of the user program 101, the tracing unit 103 may store access information about an access of the instruction #1 to a memory region #1, and may execute the instruction #1. In this example, an instruction #2 may be executed right after the page fault is processed.

Figure 2:
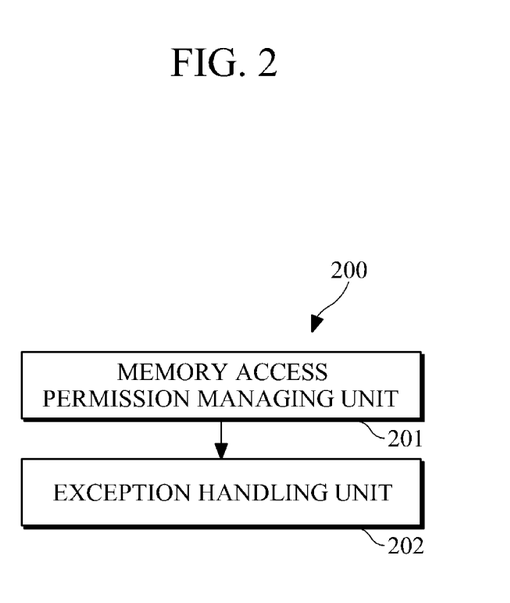
FIG. 2 is a diagram illustrating an example of an apparatus for tracing memory access information.

FIG. 2 illustrates an example of an apparatus for tracing memory access information. For example, the apparatus for tracing memory access information may be an example of the tracing unit 103 shown in FIG. 1. That is, the apparatus may identify regions of memory accessed by a user program. In addition, the apparatus 200 may be referred to as an apparatus for handling a page fault.

Referring to FIG. 2, apparatus 200 includes a memory access permission managing unit 201 and an exception processing unit 202.

The memory access permission managing unit 201 may set access permission about a memory region to be used by a user program such that access to the memory region is not allowed while the apparatus 200 is in a user mode and is allowed while the apparatus 200 is in a supervisor mode.

For a user program using a virtual address space to access a physical address space, an address translation table (TLB)

may be used. According to this example, the access permission may be recorded at a predetermined field of the TLB (shown in FIG. 3).

Figure 3:
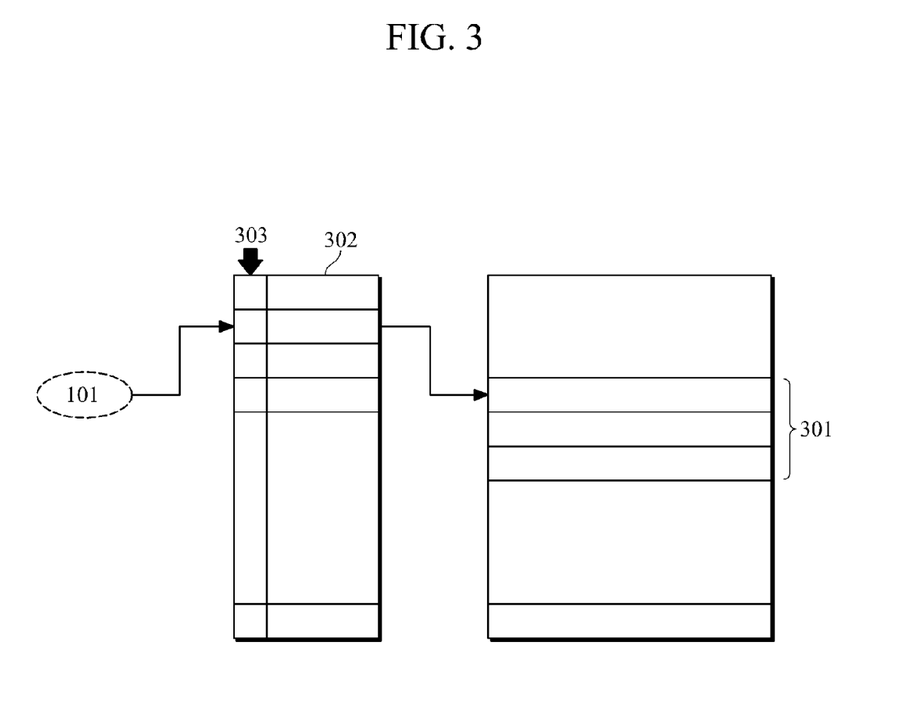
FIG. 3 is a diagram illustrating an example of a method of setting an access permission.

FIG. 3 illustrates an example of a method of setting access permission.

Referring to FIG. 3, user program 101 generates a virtual address to access a predetermined region 301 of a memory. The generated virtual address is translated to a physical address by the TLB. Each entry of the TLB may have a physical address that corresponds to a respective virtual address. In addition, each entry may have an access permission field 303 that indicates access permission to the corresponding physical memory region.

Referring to again FIG. 2, the memory access permission managing unit 201 may set the access permission field 303 for the memory region 301 such that a read/write operation on a corresponding memory region is not allowed during user mode and is allowed during supervisor mode.

For example, an access permission that is set such that a read/write is allowable only during a supervisor mode may be referred to as an access permission set for tracing.

If the memory access permission managing unit 201 sets an access permission field, for example, the access permission field (303 of FIG. 3) to the access permission set for tracing, a user program being executed while in user mode encounters a page fault due to the absence of access permission. As the page fault occurs, the exception handling unit 202 is invoked to handle the page fault.

The exception handling unit 202 may handle the page fault based on the access permission that is set by the memory access permission managing unit 201. In addition, while in the supervisor mode, the exception handling unit 202 may store memory access information of the user program to trace the memory access information at the same time as executing the instruction that causes the page fault, thereby ensuring a normal operation of the user program.

As described above, the memory access permission managing unit 201 may set the access permission such that when a user program accesses a memory region a page fault occurs, and the exception handling unit 202 may store memory access information at the same time as executing the instruction that caused the page fault. Accordingly, the memory access information may be traced and the normal operation of the user program may be ensured.

Figure 4:
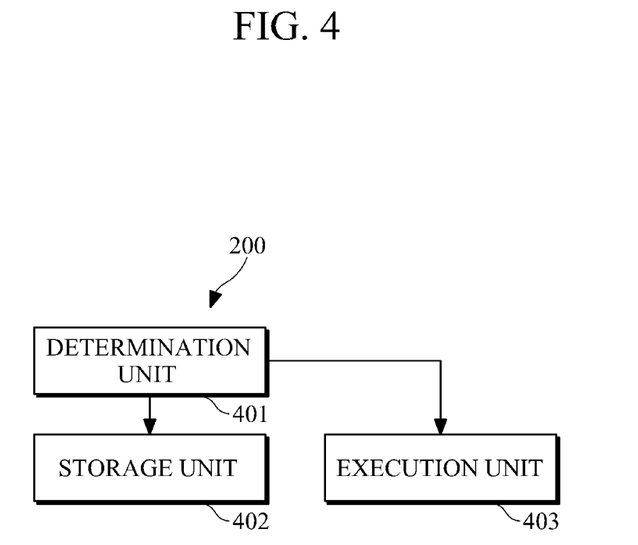
FIG. 4 is a diagram illustrating an example of an exception handling unit.

FIG. 4 illustrates an example of an exception handling unit. For example, the exception handling unit may be an example of the exception handling unit 202 shown in FIG. 2.

Referring to FIG. 4, exception handling unit 400 includes a determination unit 401, a storage unit 402, and an execution unit 403.

In response to a page fault occurring, the determination unit 401 may be invoked. Referring to FIGS. 2 and 4, the invoked determination unit 401 may determine whether the page fault is caused by the access permission that is set by the memory access managing unit 201. For example, the determination unit 401 may determine whether a page fault is caused by the access permission set for tracing. For example, the determination unit 401 may determine whether a page fault occurs while in a user mode, whether a page fault is caused by a user program to be traced, whether a memory region corresponding to a page fault is a memory region to be traced, and the like.

If the determining unit 401 determines that the page fault is caused by the access permission that is set by the memory access permission managing unit 201, the storage unit 402 may store memory access information related to an instruction causing the page fault. For example, the memory access information stored in the storage unit 402 may be an address of the instruction causing the page fault, a type of the instruction causing the page fault, an address of a memory region at which the page fault occurs, a time at which the page fault occurs, an identifier of a process or thread including the instruction causing the page fault, and the like.

If the determining unit 401 determines that the page fault is caused by the access permission that is set by the memory access permission managing unit 201, the execution unit 403 may execute the instruction causing the page fault.

For example, if a page fault occurs while the apparatus is in a user mode, a system mode may be converted from the user mode to a supervisor mode and the determination unit 401 may be invoked. Also, if a page fault occurs, context information about a system may be stored or backed up in a predetermined region of a memory. For example, the context information may include a result of an execution of an instruction and a register value at the moment of a page fault.

For example, the execution unit 403 may execute an instruction that causes the page fault by use of the stored context information. For example, the execution unit 403 may generate an instruction that is substantially the same as the instruction that causes the page fault by analyzing the context information that is stored in a predetermined region of the memory according to the page fault.

In addition, the execution unit 403 may generate the generated instruction and may update the context information. For example, if the generated instruction is an instruction instructing a register value to be written to memory, a register value may be read from context information and the register value read from the context information may be written to the memory. As another example, if the generated instruction is an instruction instructing a memory value to be written to a register, a memory value may be read from the memory and the context information may be updated using the memory value read from the memory.

The context information may be stored in a first region of the memory. The region of memory accessed when the instruction substantially the same as the instruction causing the page fault is executed, may be a second region of the memory at which the context information is not stored. In addition, the execution unit 403 may operate while in the supervisor mode. The access permission may be set such that an access for a write/read operation on a memory region is allowable while in the supervisor. Accordingly, the execution unit 403 may execute instructions without the restriction of access to the memory region, and may update the context information.

Figure 5:
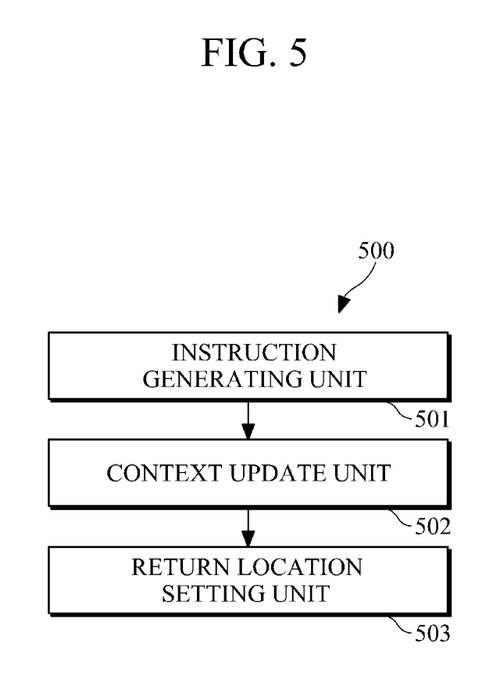
FIG. 5 is a diagram illustrating an example of an execution unit.

FIG. 5 illustrates an example of an execution unit. For example, the execution unit may be an example of the execution unit 403 shown in FIG. 4.

Referring to FIG. 5, execution unit 500 includes an instruction executing unit 501, a context update unit 502, and a return location setting unit 503.

The instruction generating unit 501 may generate an instruction that is substantially the same as the instruction that causes the page fault, based on the context information that is generated according to the page fault. The substantially the same instruction represents an instruction that produces the same execution result as that of the instruction that causes the page fault.

For example, the instruction generating unit 501 may determine the type of instruction that causes the page fault by analyzing context information backed up according to the page fault, and may generate a series of instructions that are the same as the instruction that causes the page fault. For example, the instruction generating unit 501 may determine whether the instruction that causes the page fault is a load instruction, a store instruction, a multiple load instruction, a multiple store instruction, a condition instruction, and the like.

The context update unit 502 may execute the generated instruction and may update the generated instruction. For example, if the generated instruction is an instruction instructing a register value to be written to a memory, the context update unit 502 may read a register value from context information stored in the first region of the memory and write the register value read from the context information to a second region of the memory. In this example, the second region is a memory region desired to be accessed by an original instruction that causes the page fault.

As another example, if the generated instruction is an instruction instructing a memory value to be written to a register, the memory value may be read from the second region of the memory desired to be accessed by the original instruction and a register value of the context information stored in the first region of the memory may be updated by use of the memory value read from the second region.

The return location setting unit 503 may set a return location of the updated context information to a location that is behind the instruction causing the page fault. Therefore, an instruction placed behind the instruction causing the page fault may be executed after the page fault is processed. The result is that a user perceives a program as if it was continually running without interruption.

Figure 6A:
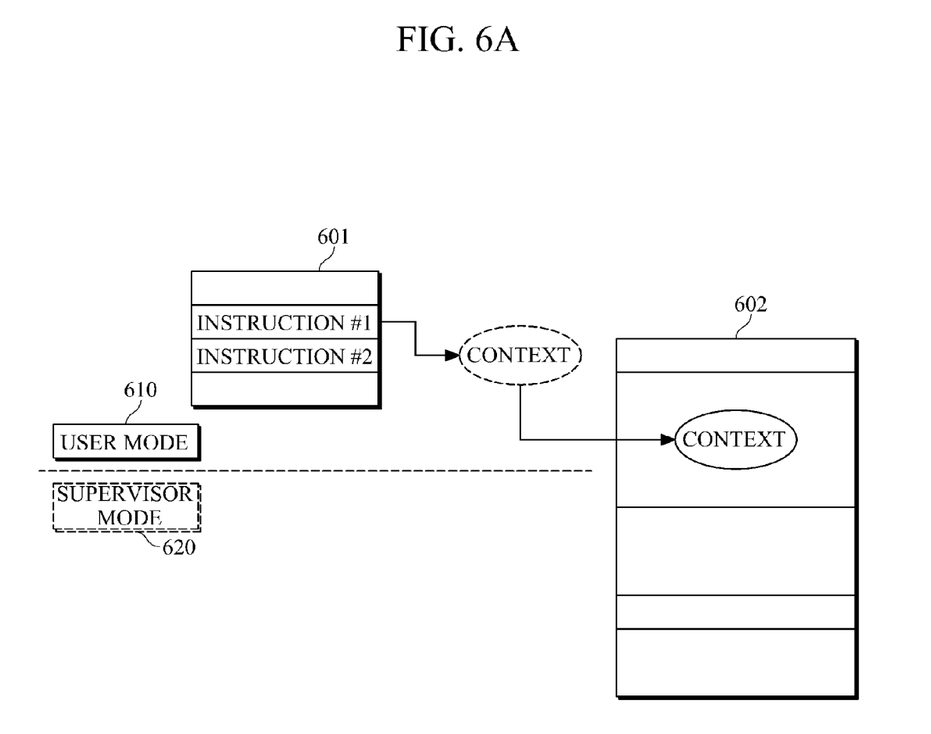
FIGS. 6A to 6C are diagrams illustrating examples of a process of executing an instruction.
Figure 6B:
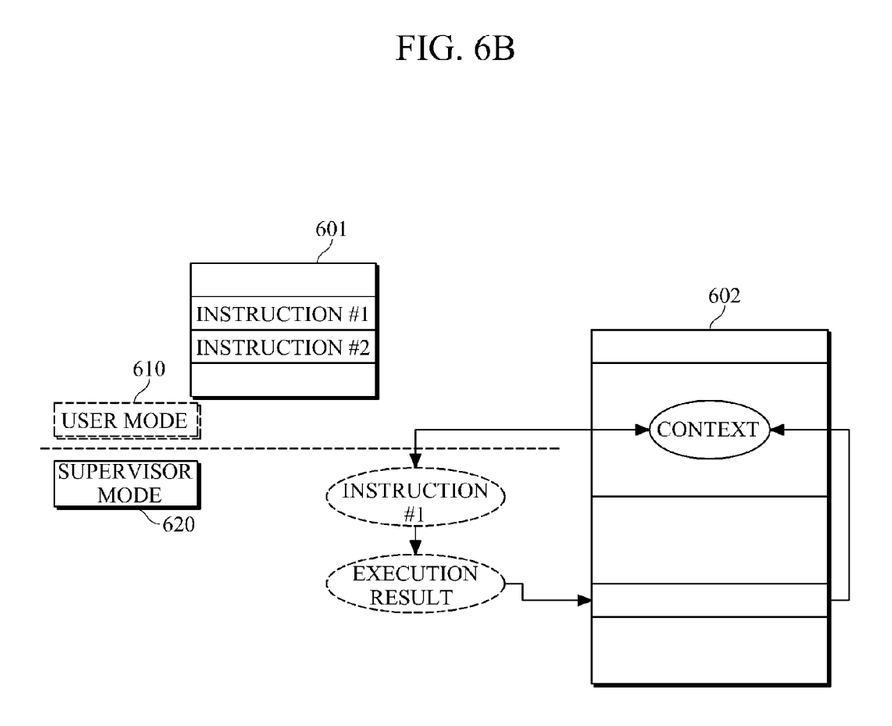
Figure 6C:
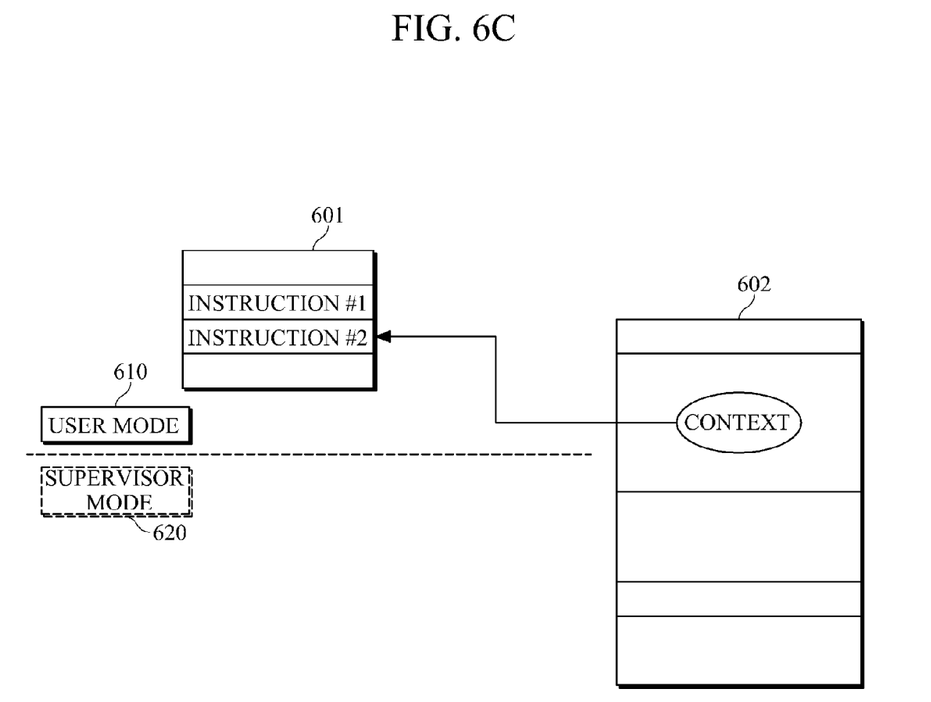

FIGS. 6A to 6C illustrate examples of a process of executing an instruction.

Referring to FIG. 6A, during the execution of a user program 601 while in user mode 610, a page fault occurs at an original instruction #1. In response to the occurrence of the page fault, context information is stored in a first region of memory 602. If the page fault is caused by an access permission that is set such that an access is not allowable while in user mode 610 and allowable while in supervisor mode 620, memory access information may be stored and the original instruction #1 may be executed while in the supervisor mode. The execution of the original instruction #1 is further described with reference to FIGS. 6B and 6C.

Referring to FIG. 6B, the original instruction #1 is executed while in the supervisor mode 620. For example, the exception handling unit (202 in FIG. 2) may generate an instruction #1 by analyzing the context information stored in the first region of the memory 602, execute the generated instruction #1, and update the context information according to the result of execution.

For example, if the original instruction #1 is an instruction instructing a register value to be written to a second region of the memory 602, the exception handling unit 202 may read a value corresponding to the register value from the first region of the memory 602 and may write the register value read from the first region to the second region of the memory 602, thereby executing the generated instruction #1 instead of the original instruction #1.

As another example, if the original instruction #1 is an instruction instructing a memory value of the second region of the memory 602 to be written to a predetermined register, the exception handing unit 202 may read the corresponding memory value from the second region of the memory 602 and may write the value read from the second region of the memory 602 to the first region, thereby executing the generated instruction #1 instead of the original instruction #1 and updating the context information. As described above, the exception handling unit 202 may operate in the supervisor mode and the access permission may be set such that an access to the memory 601 is not restricted while in the supervisor mode. Accordingly, the exception handling unit 202 may access the memory 601 without causing a page fault.

Referring to FIG. 6C, a return location of the updated context information is also updated. For example, the exception handling unit 202 may set the return location of the updated context information to a location of an instruction #2, that is, a location that is behind the original instruction #1 that causes the page fault. Accordingly, the instruction #2 may be executed after exception handling regarding the page fault is finished. As a result, a user perceives a program as running continuously.

Figure 7:
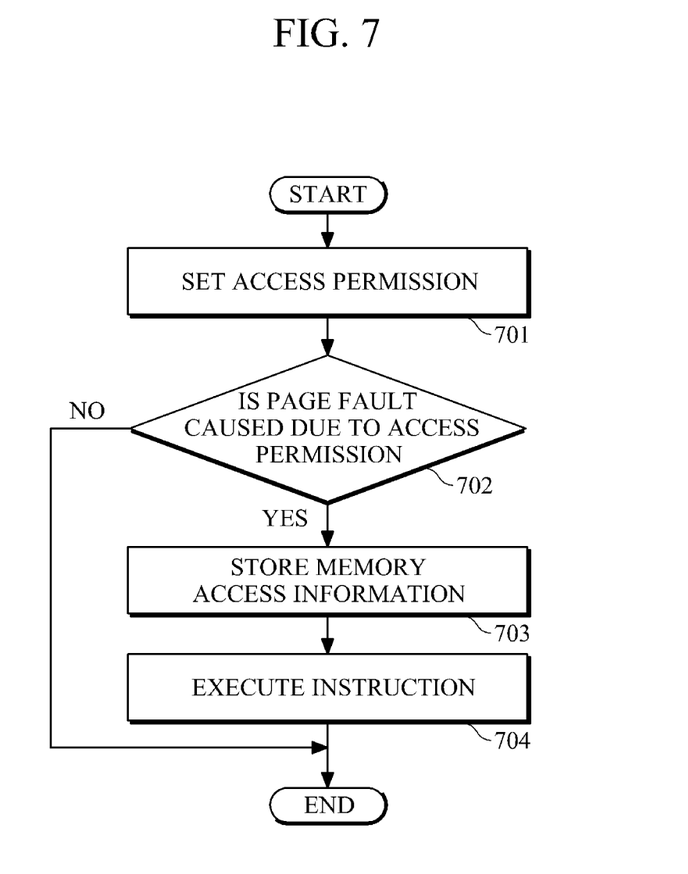
FIG. 7 is a diagram illustrating an example of a method of tracing memory access information.

FIG. 7 illustrates an example of a method of tracing memory access information.

Referring to FIG. 7, an access permission is set such that access to a memory region to be traced is not allowable while in a user mode and is allowable while in a supervisor mode, in 701. For example, the memory access information tracing apparatus (200, in FIG. 2) may set the access permission with respect to a memory region, which needs to be used by a user program, as shown in FIG. 3.

Whether a page fault occurs due to the access permission is determined, in 702. For example, the memory access information tracing apparatus 200 may determine whether a page fault occurs while in user mode, a page fault occurs due to a user program to be traced, and a memory region corresponding to a page fault is a memory region to be traced. If a page fault is caused by another reason other than the access permission, the page fault may not be related to the memory access tracing and the page fault may be processed by a conventional exception handling.

If a page fault is caused by the access permission, in 703 memory access information is stored. For example, the memory access information tracing apparatus (200, in FIG. 2) may store an address of an instruction that causes the page fault, the type of the instruction that causes the page fault, an address of a memory region at which the page fault occurs, a time at which the page fault occurs, an identifier of a process or thread including the instruction causing the page fault, and the like.

Thereafter, the instruction causing the page fault is executed, in 704. For example, the memory access information tracing apparatus (200 in FIG. 2) may execute the instruction causing the page fault while in the supervisor mode while updating context information that is stored according to the page fault.

Various aspects described herein are directed towards an apparatus. For example, the apparatus may comprise a memory access managing unit to set access permission of a region of memory. The apparatus may also comprise a determination unit to determine that a page fault is caused by the access permission set by the memory access managing unit. The apparatus may also comprise an exception handling unit, in response to determining a page fault is generated based on the access permission, to store memory access information of a user program and to execute an instruction of the user program.

For example, the determination unit may determine that the page fault is caused by the instruction of the user program accessing the region of memory that has access permission set by the memory access unit.

The apparatus may further comprise a tracing unit that may trace the instruction that causes the page fault while the exception handling unit simultaneously executes the instruction.

In certain aspects, the exception handling unit may comprise a storage unit to store the context information of the user program, in response to determining the instruction that caused the page fault is to be traced.

The instruction that is executed by the exception handling unit may be substantially the same as the instruction that causes the page fault, and the substantially the same instruction may be generated based on the memory access information stored by the exception handling unit. For example, the exception handling unit may comprise an instruction generating unit that generates an instruction that is substantially the same as the instruction that causes the page fault, based on context information of the user program that is stored in response to the occurrence of the page fault, and the exception handling unit executes the substantially the same instruction. The substantially the same instruction may produce the same execution result as the instruction that causes the page fault.

In certain aspects, the exception handling unit may comprise a return location setting unit that sets a return location of the user program to an instruction that is directly after the instruction causing the page fault, such that the user program continuously operates without interruption.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to trace memory access information, the apparatus comprising:
   a processor comprising
   a memory access permission managing unit configured to set an access permission of a memory region to be used by a user program such that an access to the memory region is not allowable at a user mode and is allowable at a supervisor mode, and
   an exception handling unit configured to
      store memory access information of the user program at the supervisor mode in response to a page fault occurring based on the access permission, and
      execute an instruction causing the page fault based on context information backed up according to the pane fault, at the supervisor mode.

2. The apparatus of claim 1, wherein the exception handling unit comprises:
   a determination unit configured to determine whether the page fault is caused by the access permission;
   a storage unit configured to store the memory access information of the instruction causing the page fault in response to the page fault being determined to be caused by the access permission; and
   an execution unit configured to execute the instruction causing the page fault in response to the page fault being determined to be caused by the access permission.

3. The apparatus of claim 2, wherein the memory access information comprises an address of the instruction causing the page fault, or a type of the instruction causing the page fault, or an address of the memory region at which the page fault occurs, or a time at which the page fault occurs, or an identifier of a process or a thread comprising the instruction causing the page fault, or any combination thereof.

4. The apparatus of claim 2, wherein the execution unit comprises:
   an instruction generating unit configured to generate the instruction based on the context information;
   a context update unit configured to
      execute the generated instruction, and
      update the context information based on a result of the execution of the generated instruction; and
   a return location setting unit configured to set a return location of the updated context information to a location behind a location of the instruction causing the page fault.

5. The apparatus of claim 4, wherein the context information includes an execution result of instructions and/or register information that are obtained up until the page fault occurs.

6. The apparatus of claim 4, wherein the return location of the updated context information is a location of an instruction directly after the instruction causing the page fault.

7. The apparatus of claim 1, wherein the access permission is recorded to a predetermined field of an address translation table, and the predetermined field corresponds to the memory region to be used by the user program.

8. The apparatus of claim 1, wherein the memory access information comprises an address of the instruction causing the page fault, a type of the instruction causing the page fault, an address of the memory region at which the page fault occurs, and a time at which the page fault occurs.

9. A method of tracing memory access information, the method comprising:
   setting an access permission of a memory region to be used by a user program such that an access to the memory region is not allowable at a user mode and is allowable at a supervisor mode;
   storing memory access information of the user program at the supervisor mode in response to a page fault occurring based on the access permission; and
   executing an instruction causing the page fault based on context information backed up according to the page fault, at the supervisor mode.

10. The method of claim 9, wherein the storing of the memory access information of the user program and the executing of the instruction causing the page fault comprises:
    determining whether the page fault is caused by the access permission;
    storing the memory access information of the instruction causing the page fault in response to the page fault being determined to be caused by the access permission; and
    executing the instruction causing the page fault in response to the page fault being determined to be caused by the access permission.

11. The method of claim 10, wherein the executing of the instruction causing the page fault comprises:
    generating the instruction based on the context information;
    executing the generated instruction;
    updating the context information based on a result of the execution of the generated instruction; and
    setting a return location of the updated context information to a location behind a location of the instruction causing the page fault.

12. An apparatus comprising:
    a processor comprising
        a memory access managing unit configured to set an access permission of a region of a memory,
        a determination unit configured to determine that a page fault is caused by the access permission, and
        an exception handling unit, in response to the page fault being determined to be caused by the access permission, configured to store memory access information of a user program, and execute an instruction of the user program based on context information backed up according to the page fault, at a supervisor mode.

13. The apparatus of claim 12, wherein the determination unit is configured to determine that the page fault is caused by the instruction of the user program accessing the region of the memory comprising the access permission set by the memory access managing unit.

14. The apparatus of claim 13, wherein the exception handling unit comprises a storage unit configured to store the memory access information of the user program in response to the page fault being determined to be caused by the instruction of the user program accessing the region of the memory.

15. The apparatus of claim 14, wherein the memory access information comprises an address of the instruction causing the page fault, or a type of the instruction causing the page fault, or an address of the region of the memory at which the page fault occurs, or a time at which the page fault occurs, or an identifier of a process or thread comprising the instruction causing the page fault, or any combination thereof.

16. The apparatus of claim 13, wherein the exception handling unit is configured to generate the instruction based on the context information.

17. The apparatus of claim 13, further comprising a tracing unit configured to trace the instruction causing the page fault while the exception handling unit simultaneously executes the instruction.

18. The apparatus of claim 12, wherein the memory access managing unit is configured to set the access permission of the region of the memory such that the region of the memory is not allowed to be accessed while the apparatus is in a user mode and such that the region of the memory is allowed to be accessed while the apparatus is in a supervisor mode.

19. The apparatus of claim 12, wherein the exception handling unit comprises an instruction generating unit configured to generate the instruction based on the context information, and the exception handling unit is configured to execute the generated instruction.

20. The apparatus of claim 12, wherein the exception handling unit comprises a return location setting unit configured to set a return location of the user program to an instruction that is directly after the instruction causing the page fault, such that the user program continuously operates without interruption.

* * * * *